Sept. 27, 1938.  E. H. SHEPARD  2,131,413

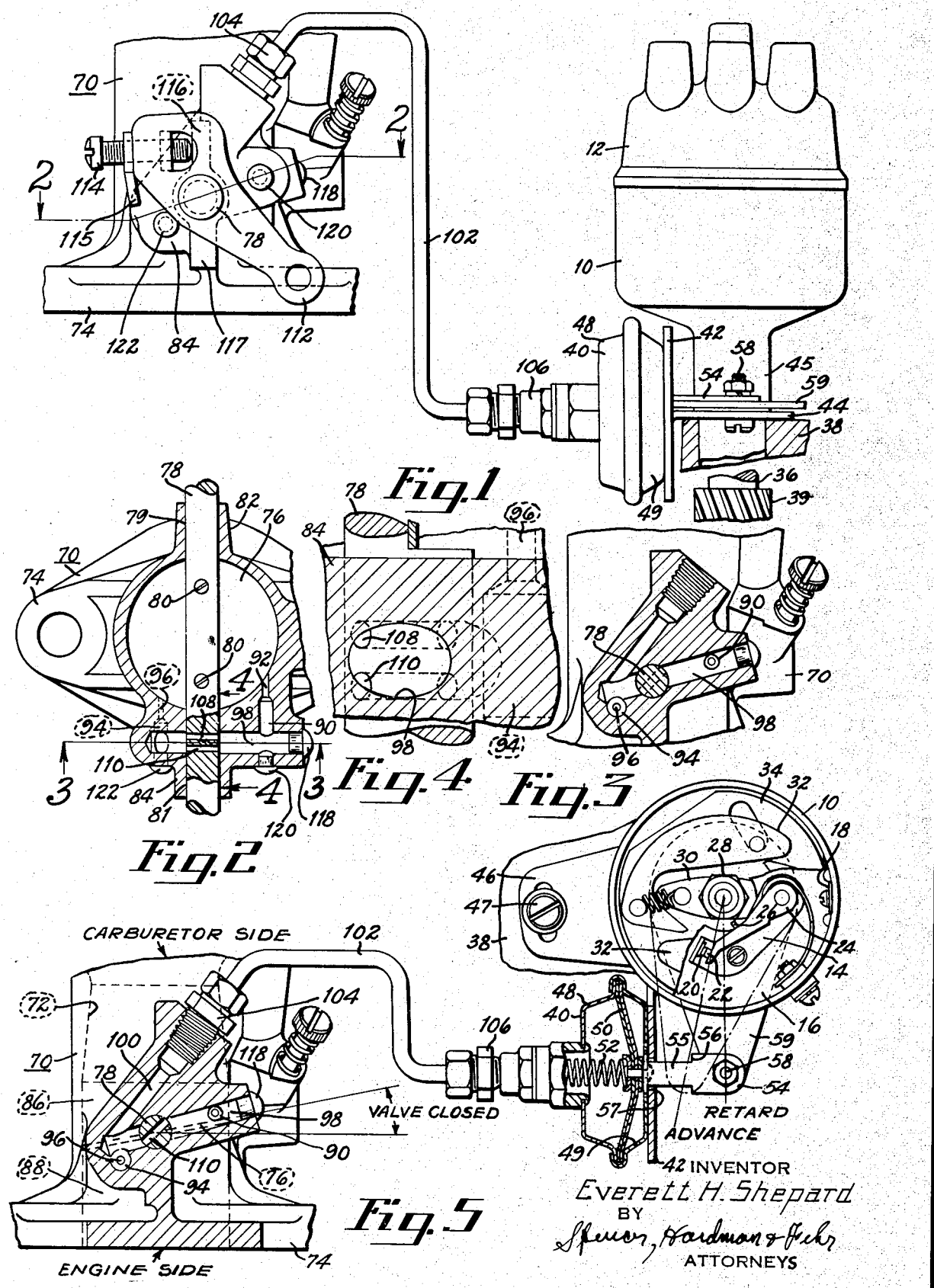

IGNITION TIMING CONTROL

Filed Feb. 28, 1936  2 Sheets-Sheet 2

INVENTOR
Everett H. Shepard
BY
Spencer, Hardman & Fuchs
ATTORNEYS

Patented Sept. 27, 1938

2,131,413

UNITED STATES PATENT OFFICE 2,131,413

IGNITION TIMING CONTROL

Everett H. Shepard, Detroit, Mich., assignor to General Motors Corporation, Detroit, Mich., a corporation of Delaware Application February 28, 1936, Serial No. 66,173

17 Claims. (Cl. 123—117)

This invention relates to apparatus for controlling the time of fuel ignition of an automotive engine, and has to do with improvements in suction created control mechanism for timer-distributors, wherein the ignition timing is controlled in response to engine operating conditions by means of a fluid motive unit.

One object of the invention is to provide mechanism to reduce the amount of motive shift of timing at the high speed end of the range of vehicle and engine speeds.

Another object of the invention is to bring the control unit into effect as soon as the throttle valve begins to open and thence gradually taper off, and finally cut off entirely the effective operation of the motive unit.

A further object of the invention is to provide means for cutting in and out a supplemental opening or port to the motive unit, whereby the effective operation of the motive unit may be more definitely controlled.

Another object of the invention is to obtain better economy of fuel during high speed engine operation, as well as smooth running motors at high speeds and on part throttle opening.

Another object is to provide means and mechanism whereby there will be no timing alteration during engine idle speeds, a gradual shift in timing as engine speed and load conditions increase, with unvarying shift over a band of moderate engine speeds, after which there will be a gradual reduction of shift as higher engine speeds are attained, and finally returned to the centrifugal control for all higher speeds.

A still further object of the invention is to provide means and mechanism for controlling the ignition timing, superimposed upon a speed responsive control mechanism, such that the spark advance curve resulting from actuation of the motive unit, will substantially blend in with the upper reaches of a spark advance curve resulting from the speed responsive timing control mechanism.

Further objects and advantages of the present invention will be apparent from the following description, reference being had to the accompanying drawings wherein a preferred embodiment of the present invention is clearly shown.

In the drawings:

Fig. 1 is an elevational view of a timer controlling device embodying the instant invention.

Fig. 2 is a cross sectional view through the fuel induction pipe or carburetor part, illustrating the relation of certain ports and passages, the view being substantially that as indicated by the line and arrows 2—2 of Fig. 1.

Fig. 3 is a sectional view through the carburetor part substantially as indicated by the line and arrows 3—3 of Fig. 2.

Fig. 4 is a sectional view in enlarged detail, and being a fragmentary view illustrating the relation of passages and valving means, substantially as indicated by the line and arrow 4—4 of Fig. 2.

Fig. 5 is a view partly in section, illustrating the fluid connection of the parts while the mechanism is at rest, or operating under engine idling conditions, with the timer fully retarded, and the motive unit non-effective.

Figure 6:
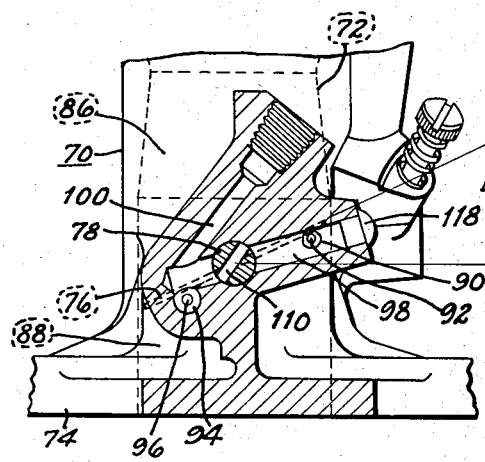
Fig. 6 is a partial view of the same, illustrating the relation of the control elements, when the engine speed has been substantially increased to a point where the motive unit begins to retract, or become non-effective just before the cut-off.

In automatic control mechanism for ignition timers, of the engine suction operated type, there has been considerable difficulty with the prior art devices in effecting the desired control for the higher engine speeds. This objection has become even more pronounced with the development of the present day high speed engines, since the fluid depressions within the intake manifold are so great, and are so rapidly increasing and long obtaining that when the conventional fluid displacement unit, or suction chamber as it is sometimes called, is tapped into the fuel induction pipe, the unit rapidly comes into action at extremely low engine speeds, and continues in operation with full force and effect throughout substantially the entire remaining portion of the engine speed range.

From the standpoint of engine efficiency and economy, and for the purpose of providing a smoothly operating mechanism, it is very desirable that there be little or no shift in timing over the centrifugal timing curve, during the engine idling speeds, and during the extremely high engine speeds. From the same standpoints it is also desirable to have a gradually effected shift in spark timing at each end of a range of predetermined shift, so that the auxiliary control may be blended in with the centrifugal control. Ignition timing by centrifugal means, that operate more or less strictly in accordance with engine speeds, have been well developed for some time. With the addition of the herein proposed engine operated control means, it is perfectly practical to fabricate control mechanism that may be superimposed upon the speed responsive or centrifugal control mechanism, and thereby accomplish each and all of the objectives herein set out.

In accomplishing the objects of this invention, provisions have been incorporated in the carburetor part adjacent the point to which the suction unit is connected, for critically proportioning the effect of the high pressure zone and the low pressure zone within the engine intake pipe, in its actuation of the diaphragm of the suction unit. Two ports have been provided in the fuel pipe so as to open therein near the edge of the throttle valve when closed, and so that one of the ports opens on the carburetor side of the throttle valve, while the other port opens on the engine side of the throttle valve, the throttle valve dividing or separating the induction pipe into what may be called a high pressure zone and a low pressure zone, respectively. The ports have an outside connection by means of an interruptible passage, and are eventually in communication with the expansion chamber by means of appropriate tubing. An extension of the throttle shaft passes through this connecting passage and carries ports or cross bores therethrough, and located angularly with respect to the connecting passage such that rotation of the throttle shaft effects the interruptible connection. By the same movement the ports may be successively transferred to opposite pressure zones.

For more detailed disclosure, reference is here made to the drawings, wherein 10 indicates a timer-distributor cup appropriately hooked up to an expansion chamber or motive unit 40 having a fluid connection with the ports of the carburetor part or fuel induction pipe 70. The distributor cup 10, fitted with its cap 12, encloses a circuit breaker mechanism 14 carried by a breaker plate 16 rigidly secured to the wall of the cup by one or more lugs 18, which is accomplished by means of screws as illustrated in Fig. 5. The circuit breaker mechanism includes a pair of separable contacts 20 and 22, one of which is carried by a pivoted lever 24, having a rubbing block 26 in cooperable relation with a cam 28 carrying a cam bar 30, and variably connected by flyweights 32 carried by a weight plate 34 mounted on an engine driven shaft 36. The speed responsive mechanism is the subject matter of prior art patents, and is not here claimed, but operates to control the ignition timing in accordance with engine speed, substantially as indicated by the dashed line curve appearing in the illustration of Fig. 9, and entitled "#3 Full load spark advance." The distributor 10, with its enclosed structure is usually mounted in an engine base 38, where it makes gear connection with an engine driven shaft by means of a pinion 39.

The motive unit 40 is mounted on an arm 42 of a hold-down bracket 44, piloted about the stem 45 of the distributor housing 10, which bracket also has an arm 46 that operates to hold the assembly to the engine base 38 by means of a yieldable device 47 that also permits of relative angular movement. The motive unit 40 comprises a suction chamber fashioned from a pair of cup members 48 and 49, in rim to rim engagement and cooperating to clamp the edge of a diaphragm 50 in sealing relation thereto. A spring 52 is confined within the cup 48 and engages the center of the diaphragm 50 to urge it toward the supporting arm 42, there being secured to the center of the diaphragm a link 54, necked in at 55 to provide stops or shoulders 56 engageable with the arm 42 at each side of a hole 57 in the arm 42 through which the link passes. The link 54 has a pivotal connection at 58 with an arm 59, which arm is clamped about the stem 45 of the timer distributor in the usual manner. Movement of the diaphragm, then, changes the angular relation of the bracket 44 and arm 59, thereby shifting the time of circuit breaker operation.

The carburetor part 70, comprises the induction pipe or an extension thereof from the engine, and may include the venturi 72 all as is substantially described in the patent to W. N. Ewart 1,961,747. In the illustrated embodiment the carburetor part 70 is of the down draft carburetor type, in which the venturi is situated on the carburetor side of the throttle valve, while the flanged part 74 is situated on the engine side of the throttle valve. The throttle valve here illustrated, is of the butterfly type and comprises a disc 76 mounted on a throttle shaft 78 by means of screws 80, which shaft 78 extends through bores 79 and 81 of bosses 82 and 84 of the carburetor part that form journal bearings for the shaft. The throttle valve 76 in its relation with respect to the fuel pipe, divides or separates the same into what may be called a high pressure zone 86 and a low pressure zone 88. The boss 84 is of substantial size and makes provision for the various drill holes forming the ports and passages specific to the control means.

There is a drill hole 90 ending in a port 92 normally opening into the high pressure zone 86 just above the edge of the throttle valve 76 when it is closed, there also being a drill hole 94 ending in a port 96 normally opening into the low pressure zone 88 of the fuel pipe. There is then provided a passage 98 that intersects the drill holes 90 and 94, as well as intersecting the journal bore 81 for the throttle shaft through the boss 84. At one end of the passage 98, there is a communicating branch 100 that has a fluid connection with the motive unit 40 by means of a pipe or tubing 102, and the coupling fixtures 104 and 106.

Where the shaft 78 extends across the passage 98, it is provided with a pair of cross bores 108 and 110 at such an angle as to provide ready communication between the ends of the passage 98 while the throttle valve is closed and opened to a substantial point, but such that the two ends of the passage 98 will be closed off from one another when the throttle valve has been moved to a substantially wide open position. The throttle shaft may be provided with an actuating link 112, that carries an adjustable stop 114 and a fixed stop 115 adapted to engage an extension 116 or 117 respectively of the boss 84, for limiting the range of throttle movement. After the passages and drill holes have been formed, the starting ends of the same may be closed off by inserting plugs as 118, 120 and 122, such that there is a fluid tight connection between the port 92 through the passages 90, 98, the interruptible connection 108 and 110, and thence to the motive unit 40 by means of the branch 100 and pipe 102.

Figure 8:
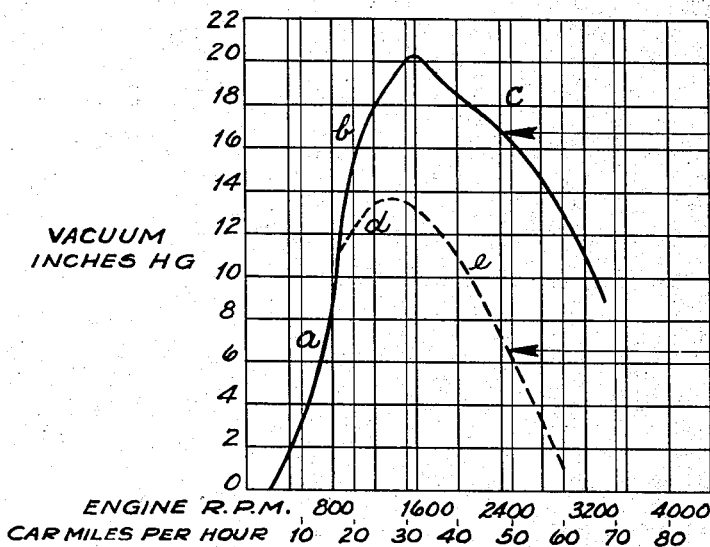
Fig. 8 is a graphic illustration of the pressure conditions that may exist in the expansion chamber of the motive unit, both with and without the influence of the control means.
Figure 9:
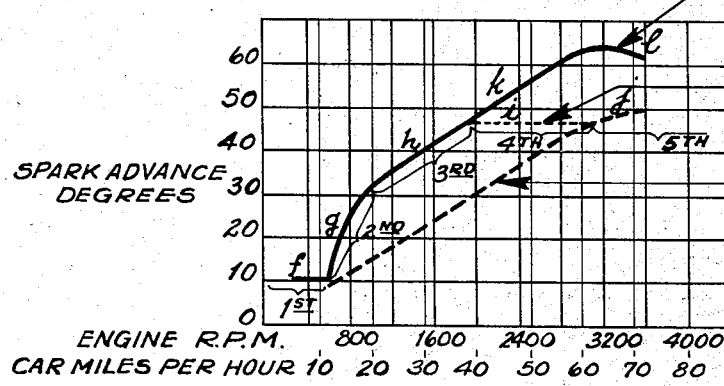
Fig. 9 is a graphic illustration of the spark advance obtainable both with and without the attendant operation of the control means as affecting the operation of the motive unit.

With structure so constituted, provision is then made for controlling the ignition timing strictly in accordance with the objects herein set out, and as graphically illustrated in Fig. 9 by the curve *f—g—h—i—j*. In Fig. 8, there is graphically illustrated by the solid line curve *a—b—c*, the pressures that usually obtain for one type of engine, where the fuel induction pipe has the single port 92, the curve depicting the pressures for all ranges of engine speed as the throttle valve is opened from an engine idling or closed position to that position of wide open or maximum speed operation. This curve comprises the branches *a—b—c*, of which the branches *b* and *c* are too great in moment of force to accomplish the desired operation of the motive unit. The resulting advance curve is shown in Fig. 9, as *f—g—h—k—l*, which provides too much timing advance for the speeds above 40 m. p. h. There is also shown in Fig. 8 a dash line curve, comprising branches *d* and *e* representing the resultant pressure occurring at the diaphragm of the expansion unit, or in the passages leading thereto, when the supplemental port 96 is added to the control mechanism, and is used in conjunction with the port 90 through the interruptible mechanism of the shaft 98. The resulting advance curve by addition of the supplemental port is shown in Fig. 9 by the curve *f—g—h—i—j*. The physical structure operating in accordance with the pressure curve *a—d—e*, is easily controllable to provide the desired amount and character of automatic spark timing shift, so that it will follow the indications of the curve *f—g—h—i—j* in Fig. 9.

In one type of automotive engine, and which may be said to be that illustrated, the initial setting of the spark timing relation is about 10° ahead of dead center. With that initial setting, as an example, it is desired in that particular engine to have no change in ignition timing during an idling range or stage of speed, which stage may be characterized as extending from a condition of rest to and including a road speed of about 12 m. p. h. or engine speed of about 650 R. P. M. Similarly, for the same type of engine, it is desired to effect a gradually increasing change in spark timing by centrifugal mechanism substantially as illustrated by the #3 Full load spark advance curve of Fig. 9. It is also desirable to apportion the engine speeds over and above the idling band of speed, into a number of bands or stages, of which there is an acceleration band during which there will be a gradual engine operated change in ignition timing, a cruising band or stage of engine speed during which the automatic shift in timing will be maintained substantially constant or equal in amount over the centrifugal advance, followed by a travel band of speed during which the amount of automatic shift will be decreased, and finally be cut off entirely just as the excessive band of engine speed is entered into, and so that the timing relation for the travel band and excessive band will be substantially the same throughout.

The accompanying table sets out the characteristics of the above indicated speed bands or stages as applied to that one type of engine, as an example:

| Stage | Speed band | Approximate speed range | Characteristics |
|---|---|---|---|
| 1st | Idling | 0 to 12 m. p. h. | From condition of rest to that speed usually obtainable in high gear over a level road with average load and engine throttle open sufficient to propel vehicle smoothly. |
| 2nd | Acceleration | 12 m. p. h. to 20 m. p. h. | That range or band of speeds above "idling" over which acceleration of vehicle speed takes place, and through which ultimate vehicle speed is attained. |
| 3rd | Cruising | 20 m. p. h. to 40 m. p. h. | That range or band of speeds usually maintainable for town and suburb driving. |
| 4th | Travel | 40 m. p. h. to 60 m. p. h. | That range or band of speeds that usually may be safely attained on country roads, when the objective is distance per unit of time. |
| 5th | Excessive | 60 m. p. h. and above. | Those speeds at the top end of the entire speed range, where progress is under the urge of some excitement or necessity and the engine is operating under somewhat exacting conditions. |

In this table, the entire speed range of the engine has been arbitrarily divided into five stages or speed bands, each band identifying a particular portion of the entire speed range over which a characteristic timing alteration is to be effected. The separate speed bands have been designated on the #2 Road load spark advance curve in Fig. 9 of the drawings by means of brackets with the indications 1st, 2nd, 3rd, 4th and 5th.

With specific reference to the graphs in Fig. 9, the desired spark timing shift is represented by the graph or curve whose connected branches are indicated as *f—g—h—i—j*. This graph indicates an absence of timer shift during the branch *f* or first stage, an increasing timer shift during the branch *g* or second stage, a maintained fixed amount of timer shift during the branch *h* or third stage, and a decreasing amount of timer shift during the branch *i* or the fourth stage, with an absence of any automatic timer shift over the branch *j* or fifth stage. Referring to the upper reaches of this desired spark timing curve, it will be noted that after the entrance upon the fourth stage, which is indicated by the dashed line beginning at about 40 m. p. h., and where the maximum amount of spark timing shift has been accomplished, that the timer setting throughout the remaining higher speeds of the engine range follows substantially a flat horizontal line, thereby maintaining the greatest amount of timer shift between about 47° and 49° ahead of top dead center throughout both the fourth and fifth stage of engine speed or for all speeds above about 40 m. p. h. From this observation of the desired spark timing curve, it will be readily apparent that the entire range of speeds might be divided into four stages instead of five, as has been done above, and might be termed as idling, low, intermediate, and running, wherein the "idling" speed band would be coextensive with that set down in the above table, and wherein "low" would apply to the same range as acceleration of the above table, while "intermediate" would constitute another name for the cruising band. Inasmuch as the spark timing curve for the travel band and excessive band substantially follows a horizontal line and is only slightly varying throughout the engine speeds above 40 m. p. h., these two bands can be included in one and termed the running band, especially since a considerable portion of automotive travel of the present day appears to be at speeds of 40 m. p. h. or more.

When the automotive engine is set into operation and condition for idling, the condition of the control elements will be substantially as illustrated in Fig. 5, wherein the throttle valve 76 is substantially closed or in the position illustrated in dashed lines. The passage 90 will then open into the high pressure zone of the induction pipe which is conditioned substantially to atmospheric pressure. This atmospheric pressure from the high pressure zone follows the bore 90, and flows into the passage 98, from whence it moves through the cross bores 108 and 110 to the opposite end of the passage 98, that is subjected to the reduced pressure of the low pressure zone through the drill hole 94 and port 96. Due to the relative size of the drill holes 90 and 94, the resulting fluid depression within the passages 98 and 100 is insufficient to result in any movement of the diaphragm 50 and its linkage with the movable part of the distributor. Consequently there is no motivated shift in the spark timing during idle speeds. This same condition of elements obtains until the throttle valve 76 is opened slightly, or to that point where the edge of the throttle valve 76 is substantially coincident or opposite to the opening of the port 92, at which position the port begins to respond to the pressures in the low pressure zone of the induction pipe. That is to say, instead of atmospheric pressure entering into port 92, the port has sufficient communication with the engine side of the throttle valve to be affected by the low pressure therein, and consequently the pressure at the port 92, which is a mixture of the two zones, is less than atmospheric pressure, though flowing into the port 92 for flushing the passage 98. As the parts of the control device have been calibrated, this change over stage becomes sufficiently effective at about 12 m. p. h. to start the motive unit to collapse, which marks the end of the first stage, and the beginning of the acceleration band of speed. The portion of the spark timing curve thus far followed is indicated in Fig. 9 at f.

As the throttle valve 76 is further opened, the high pressure zone within the intake or fuel pipe has less effect upon the resulting pressure within the passage 98 and branch 100 due to the fact that movement of the throttle 76 in passing over the port 92 gradually cuts off the amount of high pressure that may enter the passage 98 by way of the drill hole 90. This reduction in admission of high pressure tends to increase the effectiveness of the low pressure at the port 96, with a consequent greater depression in the motive unit 40 whereby the diaphragm 50 is gradually pulled down against the spring 52 through which the arm 59 of the distributor is actuated, and resulting in that branch of the spark timing curve designated g.

This graduated and increasing shift is substantially completed when the engine attains a speed equivalent to about 20 m. p. h., at which point the link 54 engages the stops provided by the bracket, that prevent any further shift in timing by any increase of depression within the motive unit.

That condition obtains until the engine produced suction falls so low as to be unbalanced by the spring 52, which occurs for higher speeds at about 40 m. p. h. The spark timing curve resulting from this phase of the operation is illustrated at h. In the illustrated embodiment it is desired to have a fixed amount of shift for the third stage of about 17° over and above the advance effected by the centrifugal device which is illustrated by the #3 curve. This continuing amount of shift extends between about 20 and 40 m. p. h. and is maintained constant by reason of the linkage of the motive unit resting against the stops.

By the time the throttle valve 76 has been moved to a position to attain road speed of about 40 m. p. h., the parts will be related to each other substantially as indicated in Fig. 6. The movement of the throttle valve to that position has in effect transferred the port 92 with its drill hole 90 to the opposite side of the throttle valve 76 so that it now opens into the low pressure zone of the induction pipe. This movement of the throttle also rotates the cross bores 108 and 110 with respect to the passage 98 so that they begin to operate as an interrupting means between the opposite ends of the passage 98. Though both ports 92 and 96 now open into the low pressure zone of the induction pipe and thereby subject all of the passage 98 and the branch 100 with its connection to the motive unit 40 to low pressure, the relation of the port 96 with respect to the edge of the throttle valve 76, and the restricting communication by way of the cross bores 108 and 110, is such that the motive unit 40 thence begins to lose its effectiveness in maintaining the shift of the timer.

Figure 7:
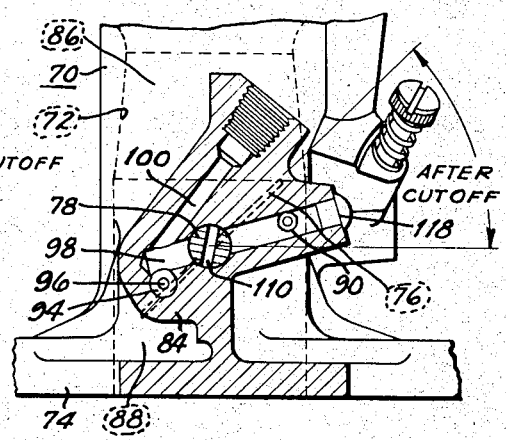
Fig. 7 is a view of the same parts illustrating the relation of the control elements when the engine speed has been further increased to a point where the valving means operates to substantially completely cut off the motive unit.

As the throttle valve 76 is opened further to attain speeds above 40 m. p. h., the port 96 is so close to the edge of the throttle valve that it begins to be affected by the high pressure zone on the carburetor side of the throttle valve. As the throttle valve is opened more and more, the high pressure zone has an increasing effect upon the supplemental port so that the port 96 actually acts as a bleed or relief port to the passage 98. However, during this time while the port 92 is being transferred to the low pressure zone which in turn subjects the passage 98 to the depression within the induction pipe, the interrupting means provided by the throttle shaft becomes sufficiently effective to reduce or cut off the influence of the low pressure zone upon branch 100, until finally a position of throttle opening is reached as illustrated in Fig. 7, wherein the port 94 has been transferred completely to the high pressure zone of the induction pipe, and the passage 98 is entirely cut off from the influence of the port 92. Under these conditions, the depression or low pressure existent at the port 94, is insufficient to maintain the motive unit in its collapsed condition, and the timer again assumes its retarded position as viewed in Fig. 5. The resulting spark timing curve effected by the transition during movement of the throttle from the position of Fig. 6 to Fig. 7 comprises the fourth step or stage of spark timing control shown at i in Fig. 9. In other words, by the time the throttle valve has been opened to the equivalent of about 60 m. p. h. road speed, the effective operation of the motive unit is entirely cut off, and the spark timing control from that point on is wholly in response to the speed responsive mechanism hereinbefore referred to.

Above the speed of 60 m. p. h., that branch of the curve effected by the speed responsive mechanism is indicated at j, and comprises that portion of the sparking timing curve that begins to flatten out near the upper end of its speed range, and where additional advance is apt to result in damaging effects upon the engine. It will be observed that the spark advance for all speeds above about 40 m. p. h. is substantially the same, in that an advance is maintained throughout those speeds from about 47° to about 49°. It is to be recalled, too, that when operation of the engine is on wide open throttle and with full load, that the spark timing may thence drop to the speed controlled curve, #3 of Fig. 9, which is as it should be for those conditions. That condition obtains whether the full load operation be at 60 m. p. h. or at some speed between that and idle.

While the embodiment of the present invention as herein disclosed, constitutes a preferred form, it is to be understood that other forms might be adopted, all coming within the scope of the claims which follow.

What is claimed is as follows:

1. Ignition apparatus for internal combustion engines, comprising in combination, a carburetor having a throttle valve providing in the carburetor a high pressure zone and a low pressure zone, a circuit interrupter, an engine driven cam for operating the interrupter, a device having communication with the carburetor and responsive to the combined pressure effect in both zones for controlling the angular relation between the interrupter and cam in order to vary the ignition timing as the throttle is opened, and means for controlling the communication to prevent any variation in timing during throttle openings for an idling speed range, to effect an advance in timing during throttle openings for an acceleration speed band, to maintain a predetermined amount of advance in timing during throttle openings for a cruising speed band, to decrease the amount of timing advance as the throttle opens for speed increases so as to maintain a fixed level of spark advance over throttle openings for a travel speed band, and to eliminate any variation in timing due to the device during throttle openings for operation in an excessive speed band.

2. The combination with an internal combustion engine having a fuel induction pipe, a throttle valve in the induction pipe, and an ignition timing device for effecting the firing of the fuel charge, of engine operated suction control means for changing the time of fuel ignition comprising, ports and passages in the induction pipe and shaft of the throttle valve so located with respect to the throttle valve when closed that there will be no shift in timing of fuel ignition during throttle openings for an idling speed range, that there will be gradually effected a predetermined amount of shift in timing during throttle openings for increased engine speed operating conditions extending over acceleration, cruising, and travel speed bands, and that there will be an entire absence of shift in timing during throttle openings for an excessive speed band, and means including a part of the throttle valve shaft for controlling the influence of the ports and passages in effecting the shift in timing whereby little change in spark timing relation from a predetermined angle will be effected for throttle openings at engine speeds greater than the cruising band.

3. The combination with an internal combustion engine having a fuel induction pipe, a throttle valve in the induction pipe, and an ignition timing device for effecting the firing of the fuel charge, of control means for changing the time of fuel ignition comprising a suction operable unit connected with ports and passages in the induction pipe and shaft of the throttle valve so located with respect to the throttle valve when closed that one port will open into a high pressure zone of the induction pipe, and that a second port will open into a low pressure zone of the induction pipe, the ports being located near the edge of the throttle valve when closed so as to be transferred to opposite pressure zones successively as the throttle valve is opened from a substantially closed position to a wide open position, whereby the pressure resulting from combining the effect of both ports will be non-operative to provide a change in the time of fuel ignition for the extremes of throttle openings.

4. In a timer controlled apparatus wherein an internal combustion engine has a fuel induction pipe with a throttle valve and shaft dividing the induction pipe into high pressure and low pressure zones, the combination with said induction pipe of an expansion chamber, and means connecting the chamber with the induction pipe, said means including ports in the induction pipe opening into each of said zones, a passage directly connecting both the ports opening into each zone, and valve means in the passage, including cross bores through the throttle shaft, for closing off the communication of said ports, and means completing fluid connection between the expansion chamber and one of said ports at all times.

5. In a timer controlled apparatus wherein an internal combustion engine has a fuel induction pipe with a throttle valve and shaft dividing the induction pipe into high pressure and low pressure zones, the combination with said induction pipe of an expansion chamber, and means connecting the chamber with the induction pipe, said means including ports in the induction pipe opening into each of said zones, a passage intercepted by the throttle shaft connecting each port opening into each zone, and valve means in the passage actuated by the throttle shaft for controlling the communication between said zone ports in response to the throttle position, one of said ports being in communication with the expansion chamber at all times.

6. In a timer controlled apparatus wherein an internal combustion engine has a fuel induction pipe with a throttle valve and shaft dividing the induction pipe into high pressure and low pressure zones, the combination with said induction pipe of an expansion chamber, and means connecting the chamber with the induction pipe, said means including ports in the induction pipe opening into each of said zones, and one of which is always in communication with the expansion chamber, a passage interconnecting both ports opening into each zone, and valve means in the passage comprising cross bores through the throttle shaft for controlling the communication between another of said ports and the expansion chamber.

7. In a timer controlled apparatus wherein an internal combustion engine has a fuel induction pipe with a throttle valve and shaft dividing the induction pipe into high pressure and low pressure zones, the combination with said induction pipe of an expansion chamber, and means connecting the chamber with the induction pipe, said means including ports provided by the induction pipe opening into each zone, one of which ports is in constant communication with the expansion chamber, a passage connecting said ports and intersected by the throttle shaft, said shaft having openings in registry with the passage and adapted to cut off communication between the ends of the passage when the throttle shaft is rotated to substantially wide open throttle position.

8. An automatic timer controlling apparatus for internal combustion engines, comprising in combination, means connected to the said timer for oscillating the same, said means including an expansion chamber providing a movable member, a fuel induction pipe on the engine having a throttle valve therein, passages and ports in the wall of the pipe controlled by the throttle valve and having connections to the expansion chamber and located so that the chamber will respond to the fluid pressures on both sides of the throttle valve as it is opened so as to cause a gradual shift in timing of ignition during low throttle engine operation, so that the chamber will maintain a definite shift in timing of ignition during a predetermined intermediate throttle engine operation, and so that the chamber will be rendered entirely ineffective during engine operation beyond the band of intermediate throttle engine operation, whereby the timing relation becomes substantially fixed for all throttled engine operation beyond said intermediate throttle engine operation.

9. In an internal combustion motor having a fuel induction pipe and a throttle valve, in which pipe suction is created by the operation of the engine, an ignition timer, a suction unit for shifting the timer for changing the time of ignition, and means connecting the induction pipe with the suction unit, said unit being responsive to the suction created in the induction pipe on the engine side of the throttle valve with modification effected by the suction in the induction pipe on the carburetor side of the throttle valve, for effecting an advance of timing during partly open throttle engine operation, and for gradually cancelling the effected advance of timing during increasingly open throttle engine operation, said unit being effective to maintain a predetermined amount of timer shift over the intermediate band of throttle openings.

10. In an internal combustion engine having a fuel pipe and a throttle valve mounted on a rotary shaft, in which pipe suction is created by the operation of the engine, and wherein the throttle valve divides the pipe into a high pressure zone and a low pressure zone, the combination comprising, an ignition timer, a suction unit for shifting the timer to vary the time of fuel ignition, and means connecting the suction unit with the induction pipe for controlling the shift of timer, said means comprising, a port in the induction pipe opening into the high pressure zone, a port in the pipe opening into the low pressure zone, a passage connecting the ports and communicating with the suction unit, and valve means operable in response to rotation of the throttle valve determining the effect of pressure at both ports upon the passage, whereby the suction unit effects no shift of timer during an idling throttle range of opening, effects a progressive shift of timer over an accelerating throttle range of opening, maintains a predetermined amount of timer shift over a cruising throttle range of opening, effects a reverse timer shift over a travel throttle range of opening, and becomes non-operative over an excessive throttle range of opening.

11. In an automatic timer control mechanism for internal combustion engines wherein an engine driven timer has speed responsive means for altering the time of fuel ignition in accordance with engine speed, and has a suction unit for effecting a shift in timing superimposed upon a speed controlled alteration and in response to fluid pressures within an engine fuel pipe divided into high and low pressure zones by a throttle valve and shaft, the combination with said fuel pipe of, ports and passages therein having interruptible communication with each other and with both pressure zones and connected with the suction unit, and means including the throttle valve and shaft determining the effective component of each zone pressure within the passage, whereby the suction unit effects a gradual shift in timing during an acceleration throttle opening band and during a travel throttle opening band, and maintains a definite amount of shift in timing during an intervening cruising throttle opening band.

12. In an automatic timer control mechanism for internal combustion engines wherein an engine driven timer has speed responsive means for altering the time of fuel ignition in accordance with engine speed, and has a suction unit for effecting a shift in timing superimposed upon a speed controlled alteration and in response to fluid pressures within an engine fuel pipe divided into high and low pressure zones by a throttle valve and shaft, the combination with said fuel pipe of, a passage in the fuel pipe, one end of which connects with the suction unit, a port at each end of the passage, one of which ports opens into the high pressure zone when the throttle is substantially closed and the other port opening into the low pressure zone, and means including the movement of the throttle and shaft, in which there is a transition of each port to the opposite pressure zone, for controlling the effective pressure in the passage that is applied to the suction unit, whereby the suction unit will effect no shift in timing during an idling throttle opening and during an excessive throttle opening, but will effect a gradually increasing shift over an acceleration throttle opening, a gradually decreasing shift over a travel throttle opening, and maintain a fixed amount of shift over a cruising throttle opening intervening the acceleration and travel throttle openings.

13. Ignition apparatus for internal combustion engines, comprising in combination, an ignition timer with means for varying the time of fuel ignition in accordance with speed, and suction actuated means for superimposing an automatic control of timing upon the variation by speed, said suction actuated means including an expansion chamber, a throttled fuel pipe, and means connecting the expansion chamber to the fuel pipe at a plurality of ports for variously combining the pressures at the ports in their effect upon the chamber, said connecting means comprising a port opening into the fuel pipe near the edge of the throttle and into the high pressure zone when the throttle is closed, a second port opening into the fuel pipe near the edge of the throttle and into the low pressure zone when the throttle is closed, said throttle when moved to wide open position successively transferring the first mentioned port to the low pressure zone of the fuel pipe, and thence transferring the second mentioned port to the high pressure zone of the fuel pipe, whereby the resulting pressure in the connecting means is insufficient to actuate the expansion chamber during both extreme positions of throttle opening, but is operable to effect a shift in timing, over the variation of timing in response to speed, for all positions of throttle opening between the said extremes of throttle opening.

14. In a timer controlled apparatus wherein an internal combustion engine has a fuel induction pipe with a throttle valve and shaft separating the induction pipe into high and low pressure zones, and in which apparatus an expansion chamber operates to alter the time of fuel ignition, the combination with said expansion chamber of means for selectively connecting the chamber with either or both zones of the induction pipe, and comprising a boss on the induction pipe providing a passage way transverse to the axis of the induction pipe, with ports at each end of the passage way opening into opposite zones of the induction pipe and near the edge of the throttle valve when closed, and means provided by the throttle shaft for intercepting free flow through the passage way, said means operating upon opening movement of the throttle shaft from its closed position so as to gradually cut off communication through the passage between the ports.

15. The combination set forth in claim 14, wherein the intercepting means provided by the throttle shaft comprise angularly disposed passages therethrough normally providing communication from end to end of the passage when the throttle valve is closed, but operable upon throttle shaft rotation to entirely interrupt fluid passage therethrough at road speeds substantially above 60 m. p. h.

16. In a timer controlled apparatus wherein an internal combustion engine has a fuel induction pipe with a throttle valve and shaft separating the induction pipe into high and low pressure zones, and in which apparatus an expansion chamber operates to alter the time of fuel ignition, the combination with said expansion chamber of means for selectively connecting the chamber with either or both zones of the induction pipe, and comprising a boss on the induction pipe intersected by the throttle shaft, said boss being drilled transverse to the axis of the induction pipe to provide a passage way, and a duct joining one end of the passage way and having communication with the expansion chamber, said induction pipe having ports providing communication with the induction pipe at each end of the passage way, one of the said ports being located at the juncture of the duct and passage end and opening into the induction pipe near the edge of the throttle valve and on the engine side thereof, another of said ports leading from the other end of said passage way into the induction pipe near the edge of the throttle valve when closed and on the carburetor side thereof, said intersecting portion of the throttle shaft providing cross bores adapted to close off communication between opposite ends of the passage way at a predetermined throttle valve position.

17. The combination set forth in claim 16, wherein the expansion chamber is subjected to the pressure at both ports during all throttle positions between closed and said predetermined throttle position, and is connected with only one of said ports for all throttle positions above said predetermined throttle position.

EVERETT H. SHEPARD.